(12) United States Patent
Su

(10) Patent No.: US 7,635,399 B2
(45) Date of Patent: Dec. 22, 2009

(54) FUEL REFORMER

(75) Inventor: Qingquan Su, Tokyo (JP)

(73) Assignee: Ebara Corporation, Tokyo (JP)

( * ) Notice: Subject to any disclaimer, the term of this patent is extended or adjusted under 35 U.S.C. 154(b) by 434 days.

(21) Appl. No.: 10/562,448

(22) PCT Filed: Jun. 27, 2003

(86) PCT No.: PCT/JP03/08230

§ 371 (c)(1), (2), (4) Date: Sep. 26, 2006

(87) PCT Pub. No.: WO2005/000737

PCT Pub. Date: Jan. 6, 2005

(65) Prior Publication Data

US 2007/0104625 A1 May 10, 2007

(51) Int. Cl.
*B01J 8/00* (2006.01)
(52) U.S. Cl. ............... 48/127.9; 48/61; 422/190; 422/191; 422/198; 422/200; 422/204; 422/211
(58) Field of Classification Search ............... 422/190, 422/191, 198, 200, 204, 211; 48/61, 127.9; 429/13
See application file for complete search history.

(56) References Cited

U.S. PATENT DOCUMENTS

| | | | | |
|---|---|---|---|---|
| 5,938,800 | A * | 8/1999 | Verrill et al. ............... | 48/127.9 |
| 6,383,468 | B1 * | 5/2002 | Schussler et al. ............ | 423/651 |
| 6,481,207 | B2 * | 11/2002 | Miura et al. ................ | 60/670 |
| 6,838,062 | B2 * | 1/2005 | Goebel et al. ............... | 422/198 |
| 7,066,973 | B1 * | 6/2006 | Bentley et al. ............ | 48/197 R |
| 7,156,886 | B2 * | 1/2007 | Nakamura et al. .......... | 48/127.9 |

(Continued)

FOREIGN PATENT DOCUMENTS

JP 59-217605 12/1984

(Continued)

OTHER PUBLICATIONS

English translation of the pertinent portion of Japanese Office Action in corresponding application.

*Primary Examiner*—N. Bhat
(74) *Attorney, Agent, or Firm*—Foley & Lardner LLP

(57) ABSTRACT

A fuel reformer which is relatively simple in structure and can be manufactured at a low cost is provided. A fuel reformer includes: a high-temperature unit 2 having a combustion chamber 5A in which fuel is burned, and a reforming section 7 disposed on the outer peripheral surface side of the combustion chamber 5A and filled with a reforming catalyst in an annular shape; a medium-low-temperature unit 3 having a shift converter section (21, 26) located on the side where the medium-low-temperature unit 3 is connected to the high-temperature unit 2 and filled with a shift converter catalyst in a cylindrical shape, and a selective oxidation section 36 located on the side opposite the side where the medium-low-temperature unit 3 is connected to the high-temperature unit 2 and filled with a selective oxidation catalyst in a cylindrical shape; a connection flow pipe 19 for supplying reformate having passed through the reforming section of the high-temperature unit 2 to the shift converter section side in the medium-low-temperature unit 3; and a vessel 13 for integrally housing the high-temperature unit 2 and the medium-low-temperature unit 3 connected by the connection flow pipe 19.

17 Claims, 8 Drawing Sheets

U.S. PATENT DOCUMENTS

| | | | |
|---|---|---|---|
| 7,367,996 B2 * | 5/2008 | Clawson et al. | 48/61 |
| 2003/0054213 A1 | 3/2003 | Ishikawa | |
| 2003/0118489 A1 * | 6/2003 | Hagan et al. | 422/191 |

FOREIGN PATENT DOCUMENTS

| | | |
|---|---|---|
| JP | 62-165873 | 7/1987 |
| JP | 2001-089104 | 4/2001 |
| JP | 2001-163601 | 6/2001 |
| JP | 2001-172003 | 6/2001 |
| JP | 2001-328801 | 11/2001 |
| JP | 2002-252018 A | 9/2002 |
| JP | 2002-284506 A | 10/2002 |
| JP | 2003-089505 A | 3/2003 |
| JP | 2003-243018 A | 8/2003 |
| JP | 2003-300703 A | 10/2003 |
| WO | WO 00/63114 | 10/2000 |

* cited by examiner

72: Second reforming additive water flow rate control section

70: First reforming additive water flow rate control section

FUEL REFORMER

TECHNICAL FIELD

The present invention relates to a fuel reformer for reforming a hydrocarbon-based fuel to produce hydrogen-rich reformate and, more particularly, to an integrated fuel reformer which is relatively simple in structure and can be manufactured at a low cost. The present invention also relates to an integrated fuel reformer which can process various types of hydrocarbon fuels including gas fuels such as a city gas, LPG and anaerobic digestion gas and liquid fuels such as kerosene and gasoline to produce reformate suitable for a solid macromolecule fuel cell.

BACKGROUND ART

In recent years, fuel cell cogeneration systems which can supply both heat and electricity are being developed from the viewpoint of preservation of the global environment. In such a system, a hydrocarbon fuel such as natural gas is reformed with steam to produce hydrogen-rich reformate (reformed gas) in a reforming device, and the produced reformate is supplied to a fuel cell to generate electricity. Therefore, the reforming device is an important element to be developed for the economic efficiency and energy efficiency of the entire system.

In general, when the fuel cell is a phosphoric acid fuel cell, the reforming device has a combustion section for supplying reforming heat, a reforming section in which a hydrocarbon is reformed into hydrogen and CO by a reforming reaction with steam, and a shift converter section in which CO in the reformate is shift-converted into hydrogen and $CO_2$ by a shift converter reaction with steam. When the fuel cell is a solid macromolecule fuel cell, the reforming device has a combustion section for supplying reforming heat, a reforming section, a shift converter section, and a selective oxidation section in which residual CO in the CO shift-converted gas is removed by a selective oxidation reaction with oxygen. For the purposes of making a reforming device compact and improving the thermal efficiency of a reforming device, an integrated reformer in which all components are integrated is proposed. For example, a multiple-cylinder type reformer and a stacked plate type reformer have been disclosed.

However, in conventional multiple-cylinder type reformers, a burner combustion section with a high-temperature, a reforming section which needs to be heated to continue a high-temperature endothermic reaction therein, and a shift converter section and a selective oxidation section which need to be cooled to continue medium-low-temperature exothermic reaction therein are arranged in concentric cylinders. Thus, the conventional multiple-cylinder type reformers have a problem that the structure is considerably complicated and a high manufacturing cost is required. Also in conventional multiple-cylinder type reformers, since the cylindrical partitions for dividing the sections have large lengths and areas and since the differences in temperature between the sections are large, a large thermal stress is generated at the joints between the sections and a considerable amount of heat passes through the partitions. As a result, the temperature distributions in different sections affect each other, making the control of the temperatures difficult and making the start-up time longer. Conventional stacked plate type reformers have basically the same problems as multiple-cylinder type reformers.

In addition, conventional reforming devices can process only either gas fuels such as city gas and natural gas or liquid fuels such as gasoline, kerosene and methanol. To use a gas fuel, mechanisms for preheating the gas fuel and for mixing the gas fuel with steam are required. To use a liquid fuel, a mechanism for evaporating the liquid fuel is required. Therefore, both reforming devices for gas fuels and reforming devices for liquid fuels are conventionally prepared to satisfy the demands of users.

However, gas fuels and liquid fuels are supplied from different suppliers and treated differently in terms of taxation such as gasoline excise taxes. Accordingly, when the reforming devices can process both gas fuels and liquid fuels, the users of fuel cells can have an advantage that they can use the best fuel depending on the prevailing economic situation. In addition, when reforming devices which can process both gas fuels and liquid fuels are manufactured, the manufacturing cost may be reduced by mass production as compared with when reforming devices for gas fuels and reforming devices for liquid fuels are manufactured separately.

The present invention has been made to solve the above problems. It is, therefore, a first object of the present invention to provide a fuel reformer which is relatively simple in structure and can be manufactured at a low cost. A second object of the present invention is to provide a fuel reformer which generates little thermal stress and has excellent durability. A third object of the present invention is to provide a fuel reformer in which the control for optimum temperature distribution is easy in every parts and which has high thermal efficiency and a short start-up time. A fourth object of the present invention is to provide a fuel reformer which can reform both gas fuels and liquid fuels.

DISCLOSURE OF THE INVENTION

A fuel reformer of the present invention for achieving the first object includes: a high-temperature unit 2 having a combustion chamber 5A in which fuel is burned, and a reforming section 7 disposed on an outer peripheral surface side of the combustion chamber 5A and filled with a reforming catalyst in an annular shape; a medium-low-temperature unit 3 having a shift converter section (21, 26) located on a side where the medium-low-temperature unit 3 is connected to the high-temperature unit 2 and filled with a shift converter catalyst in a cylindrical or annular shape, and a selective oxidation section 36 located on a side opposite the side where the medium-low-temperature unit 3 is connected to the high-temperature unit 2 and filled with a selective oxidation catalyst in a cylindrical or annular shape; a connection flow pipe 19 for supplying reformate having passed through the reforming section of the high-temperature unit 2 to the shift converter section side in the medium-low-temperature unit 3; and a vessel 13 for integrally housing the high-temperature unit 2 and the medium-low-temperature unit 3 connected by the connection flow pipe 19.

The combustion chamber 5A typically has a burner 4 therein for burning the fuel. The burner 4 is typically located on the central axis of the combustion chamber 5A.

In the fuel reformer constituted as described above, the temperature of the reforming section 7 of the high-temperature unit 2 increases, for example, from about room temperature at start-up to an operating temperature during steady operation. In the medium-low-temperature unit 3, the temperature of the shift converter section (21, 26) increases from about room temperature at start-up to a shift converter section temperature during steady operation, and the temperature of the selective oxidation section 36 increases from about room temperature at start-up to a selective oxidation section temperature during steady operation. The high-temperature unit 2 and the medium-low-temperature unit 3 are divided based on the operating temperatures during steady operation as described above, and the reformate is made to flow according to the order of the processes, reforming→shift-converting→selective oxidation, by the connection flow pipe 19. Also, the high-temperature unit 2 and the medium-low-temperature unit 3 are integrally housed in the vessel 13. Thus, the fuel reformer is simple in structure and can be manufactured at a low cost. Preferably, the high-temperature unit 2 and the medium-low-temperature unit 3 may have a common axis and a circular or rectangular (including square) cross-section. Then, there can be provided a fuel reformer whose shape is suitable for the place where the user wishes to install it. In particular, when the high-temperature unit 2 and the medium-low-temperature unit 3 have a circular cross-section, the gas can flow uniformly and the production materials can be saved. When the high-temperature unit 2 and the medium-low-temperature unit 3 have a rectangular, in particular square, cross-section, the fuel reformer can be easily installed.

Preferably, the fuel reformer of the present invention may further include: a reforming additive water passage 40 formed in a gap between outer walls of the high-temperature unit 2 and the medium-low-temperature unit 3 and an inner wall of the vessel 13; and a reforming additive water injection port 41 provided at an end of the reforming additive water passage 40 on a side opposite the side where the medium-low-temperature unit 3 is connected to the high-temperature unit 2.

In the above constitution, since heat can be exchanged between the reforming additive water flowing through the reforming additive water passage 40 and the reformate via the outer walls of the high-temperature unit 2 and the medium-low-temperature unit 3 during steady operation, the thermal efficiency is improved.

Preferably, the fuel reformer of the present invention for achieving the forth object may further may include: a reforming material supply passage 50 for supplying reforming material to the high-temperature unit 2; and a mixing chamber 44 communicating the reforming additive water passage 40 and the reforming material supply passage 50. Then, a process necessary to make the reforming reaction in the reforming section 7 smooth can be performed on the reforming material in the mixing chamber 44 using superheated steam converted from the reforming additive water in the reforming additive water passage 40. That is, the fuel is evaporated when the fuel is a liquid fuel, or the fuel is preheated when the fuel is a gas fuel.

Preferably, the fuel reformer of the present invention for further achieving the third and forth object may include: a reforming material supply passage 50 for supplying reforming material to the high-temperature unit 2; a second reforming additive water passage 45 for supplying reforming additive water directly to the high-temperature unit 2, not through the medium-low-temperature unit 3; and a mixing chamber 44 communicating the reforming additive water passage 40, the reforming material supply passage 50 and the second reforming additive water passage 45.

When the fuel reformer constituted as described above is activated, reforming additive water as a preheating medium is supplied from the second reforming additive water passage 45 and shift-converted into steam by heat exchange with combustion gas in the mixing chamber 44. The generated steam flows in the reverse direction through the reforming additive water passage 40 to preheat the medium-low-temperature unit 3. Thus, since the medium-low-temperature unit 3 can be preheated without using a heating medium such as nitrogen, the start-up time can be shortened. Also, since the medium-low-temperature unit 3 is preheated before introduction of the reformate, condensation of water on the shift converter catalyst layer and the selective oxidation catalyst layer in the medium-low-temperature unit 3 at the time of introduction of the reformate can be prevented and the service lives of the catalysts can be extended.

In addition, the temperature of each section can be controlled stably only by adjusting the ratio of the amounts of the water flowing through the reforming additive water passage 40 and the second reforming additive water passage 45 without changing the total flowing amount of reforming additive water.

The fuel reformer of the present invention for achieving the third object may further include: a baffle plate 18 provided in a gap at a joint between the high-temperature unit 2 and the medium-low-temperature unit 3; and a heat exchanging section 24 provided between opposite faces of the high-temperature unit 2 and the medium-low-temperature unit 3 for exchanging heat between reformate flowing from the high-temperature unit 2 to the medium-low-temperature unit 3 and the reforming additive water. Then, the reforming additive water flowing through the reforming additive water passage 40 and the reformate exchange heat via the outer walls of the high-temperature unit 2 and the medium-low-temperature unit 3 in the heat exchanging section 24 to be evaporated and superheated and the temperature distribution in the fuel reformer is optimized.

In the fuel reformer of the present invention for achieving the second and third object, where the connection flow pipe 19 has an expandable member expandable and contractible in the axial direction of the connection flow pipe 19, the distortion caused by thermal expansion of the high-temperature unit 2, the medium-low-temperature unit 3 and the vessel 13 when these are shifted from a cooled state at start-up to a heated state during steady operation can be absorbed by expansion or contraction of the connection flow pipe 19. Thus, even if the start-up and operation of the fuel reformer are repeated, the influence of thermal stress is not increased. The member to expand or contract may be a member having a wavy cross-section like a bellows or a member which can be easily bent like a diaphragm. In addition, such an expandable member has a larger surface area than a straight pipe, the heat exchange between the reformate flowing through it and the reforming additive water flowing outside it can be performed efficiently.

In the fuel reformer of the present invention, where the high-temperature unit 2 is located on the upper side and the medium-low-temperature unit 3 is located below the high-temperature unit 2, the phase change from water to steam can occur naturally when a reforming additive water passage is provided since the difference in specific gravity between water and steam coincides with the direction of gravity. In the fuel reformer of the present invention, the high-temperature unit 2 may be located on the lower side and the medium-low-temperature unit 3 may be located above the high-temperature unit 2. When water and/or reforming material are supplied to the fuel reformer using existing piping systems, the installation of the fuel reformer may be facilitated when the fuel reformer is installed upside down.

Preferably, in the fuel reformer of the present invention, the shift converter section may have a first shift converter section 21 located on a side of the high-temperature unit 2 and filled with a first shift converter catalyst in a cylindrical or annular shape, and a second shift converter section 26 located on a side of the selective oxidation section 36 and filled with a second shift converter catalyst in a cylindrical or annular shape. Then, the temperature distribution in the shift converter section can be optimized and the heat generated by the shift converter reaction can be easily removed. Also, since the first shift converter section 21 has a higher temperature than the second shift converter section 26 during steady operation, the compositions of the first shift converter catalyst and the second shift converter catalyst can be appropriately selected so that the shift converter reaction can proceed efficiently at the temperatures during steady operations.

Preferably, in the fuel reformer of the present invention, as shown in FIG. 7 for example, the second shift converter section 26 may have: an inner cylinder 29 disposed coaxially with an outer wall of the medium-low-temperature unit 3; and an intermediate cylinder 30 disposed coaxially with an outer wall of the medium-low-temperature unit 3 and on the outer peripheral side of the inner cylinder 29, and a gas introduction passage 31 for the reformate having passed through the first shift converter section 21 may be defined by an inner peripheral surface of the inner cylinder 29, a catalyst filled-layer 25 of the second shift converter section 26 may be defined by an outer peripheral surface of the inner cylinder 29 and an inner peripheral surface of the intermediate cylinder 30, and a gas discharge passage 32 may be defined by an outer peripheral surface of the intermediate cylinder 30 and an inner peripheral surface of the medium-low-temperature unit 3. That is, the reformate having passed through the first shift converter section 21 passes through the gas introduction passage 31 and the catalyst filled-layer 25 and is directed to the selective oxidation section 36 through the gas discharge passage 32.

Preferably, in the fuel reformer of the present invention, as shown in FIG. 7 for example, the second shift converter section 26 may have: a first opening 33 communicating the gas introduction passage 31 and the catalyst filled-layer 25 of the second shift converter section 26, and disposed at the inner cylinder 29 on the side of the selective oxidation section 36; and a second opening 28 communicating the catalyst filled-layer 25 of the second shift converter section 26 and the gas discharge passage 32, and disposed at the intermediate cylinder 30 on the side of the first shift converter section 21. That is, the reformate having passed through the first shift converter section 21 flows downward through the gas introduction passage 31, turns around at the first opening 33 and flows upward through the catalyst filled-layer 25. The reformate discharged from the catalyst filled-layer 25 turns around at the second opening 28, and flows downward through the gas discharge passage 32 to the selective oxidation section 36.

Preferably, the fuel reformer of the present invention may, as shown in FIGS. 1 and 7 for example, include a baffle plate 38 in a gap between the shift converter sections (21, 26) and the selective oxidation section 36, and a selective oxidation air introduction port 58 may be located in an opening at a center of the baffle plate 38. Then, the reformate shift-converted in the shift converter section and selective oxidation air can be properly mixed and the selective oxidation reaction proceeds effectively in the selective oxidation section 36.

Preferably, in the fuel reformer of the present invention, as shown in FIG. 7 for example, the selective oxidation section 36 may have a cylindrical hollow section 36B through which the reformate flowing from the shift converter sections (21, 26) cannot pass in a vicinity of a center thereof. Then, the flow of reformate through the central area of the selective oxidation section 36 through which a large amount of the reformate tends to flow is suppressed. Thus, the reformate flows uniformly through the peripheral area of the selective oxidation section 36, and the selective oxidation reaction proceeds uniformly. Therefore, the amount of selective oxidation catalyst to be filled in the selective oxidation section 36 can be optimized and the temperature distribution in the selective oxidation section 36 can be optimized.

Preferably, in the fuel reformer of the present invention, as shown in FIG. 8 for example, the medium-low-temperature unit 3 may have a shift converter section (21, 26) having a first shift converter section 21 located on a side of the high-temperature unit 21 and filled with a first shift converter catalyst in a cylindrical or annular shape and a second shift converter section 26A filled with a second shift converter catalyst in a cylindrical or annular shape and disposed coaxially with the selective oxidation section. Then, the second shift converter section 26A and the selective oxidation section 36A are arranged concentrically and the fuel reformer can be compact as a whole.

Preferably, in the fuel reformer of the present invention, as shown in FIG. 8 for example, the second shift converter section 26A may have an inner cylinder 29A disposed coaxially with an outer wall of the medium-low-temperature unit 3, and an intermediate cylinder 30A disposed coaxially with the outer wall of the medium-low-temperature unit 3 and on the outer peripheral side of the inner cylinder 29A. The second shift converter section 26A also has a catalyst-filled layer 25A in a space defined by an outer peripheral surface of the inner cylinder 29A and an inner peripheral surface of the intermediate cylinder 30A. The selective oxidation section 36A has a selective oxidation catalyst-filled layer 35A in a space defined by an outer peripheral surface of the intermediate cylinder 30A and an inner peripheral surface of the medium-low-temperature unit 3. A gas introduction passage 31A is formed between opposite faces of the first shift converter section 21 and the second shift converter section 26A and feeds the reformate having passed through the first shift converter section 21 to the second shift converter section 26A. A gas discharge passage 32A is formed by a conduit 70A communicating the bottom side of the second shift converter section 26A and a part of the selective oxidation section 36A facing the first shift converter section 21 and feeds the reformate having passed through the second shift converter section 26A to the selective oxidation section 36A.

In the device constituted as described above, the reformate having passed through the first shift converter section 21 passes through the gas introduction passage 31A and then the second shift converter section 26A, and is directed to the selective oxidation section 36A through the gas discharge passage 32A. Since the selective oxidation section 36A is disposed annularly around the second shift converter section 26A, the flow of reformate through the central area of the reformer through which a large amount of reformate tends to flow is suppressed. Thus, the reformate flows uniformly through the peripheral part of the selective oxidation section 36A and the selective oxidation reaction proceeds uniformly. As a result, the amount of selective oxidation catalyst to be filled in the selective oxidation section 36A can be optimized and the temperature distribution in the selective oxidation section 36A can be optimized.

Preferably, the fuel reformer of the present invention may, as shown in FIG. 8 for example, further include: a baffle plate 27A disposed between opposite faces of the first shift converter section 21 and the second shift converter section 26A, where the gas introduction passage 31A is defined by the baffle plate 27A, an inner peripheral surface of the intermediate cylinder 30A, and an outer peripheral surface of the inner cylinder 29A. Preferably, the baffle plate 27A may have an annular shape and a gas dispersion plate 34A is disposed in the center of the annular shape. Then, the reformate can flow uniformly through the second shift converter section 26A and the shift converter reaction proceeds uniformly.

Preferably, in the fuel reformer of the present invention, as shown in FIG. 8 for example, the gas discharge passage 32A may be defined by a bottom 39 of the intermediate cylinder 30A, an inner peripheral surface of the inner cylinder 29, and a conduit 70A connecting the inner peripheral surface of the inner cylinder 29A and the selective oxidation section 36A. Then, the gas discharge passage 32A can be effectively arranged in the reformer with a compact shape. Preferably, the selective oxidation air introduction port 58 may be located in a first opening 33A at an end of the inner cylinder 29 on the side of the bottom 39 of the intermediate cylinder 30A. Then, the reformate shift-converted in the shift converter section (21, 26A) and selective oxidation air are properly mixed and the selective oxidation reaction proceeds effectively in the selective oxidation section 36A.

Preferably, the fuel reformer of the present invention may further include a vacuum heat insulating layer 60 provided on an outer periphery of the vessel 13. Then, the reformer can be compact as a whole and heat loss from the high-temperature unit 2, the medium-low-temperature unit 3 and the reforming additive water flowing through the reforming additive water passage 40 can be reduced. Therefore, the thermal efficiency of the reformer can be improved. Preferably, the wall surface of the vacuum heat insulating layer 60 may be made of a material with a high reflectivity such as silver plate or aluminum plate. Then, heat radiation as well as heat conduction can be reduced.

A fuel reformer of the present invention for achieving the third and forth object includes, as shown in FIG. 1 for example: a high-temperature unit 2 having a combustion chamber 5A in which fuel is burned, and a reforming section 7 disposed on the outer peripheral side of the combustion chamber 5A and filled with a reforming catalyst; a medium-low-temperature unit 3 having a shift converter section (21, 26) for shift-converting reformate having passed through the reforming section 7 of the high-temperature unit 2, and a selective oxidation section 36 for performing selective oxidation of the reformate shift-converted in the shift converter section; a reforming additive water passage 40 which is disposed in such a manner that reforming additive water can undergo heat exchange in the medium-low-temperature unit 3 and which can supply the reforming additive water to the high-temperature unit 2; a second reforming additive water passage 45 for supplying reforming additive water directly to the high-temperature unit 2, not through the medium-low-temperature unit 3; a reforming material supply passage 50 for supplying reforming material to the high-temperature unit 2; and a mixing chamber 44 communicating the reforming additive water passage 40, the second reforming additive water passage 45 and the reforming material supply passage 50.

When the fuel reformer constituted as described above is activated, reforming additive water as a preheating medium is supplied from the second reforming additive water passage 45 and shift-converted into steam by heat exchange with combustion gas in the mixing chamber 44. The generated steam flows in reverse through the reforming additive water passage 40 to preheat the medium-low-temperature unit 3. Thus, since the medium-low-temperature unit 3 can be preheated without using a heating medium such as nitrogen, the start-up time can be shortened. Also, since the medium-low-temperature unit 3 is preheated before introduction of the reformate, condensation of water on the shift converter catalyst layer and the selective oxidation catalyst layer in the medium-low-temperature unit 3 at the time of introduction of the reformate can be prevented and the service lives of the catalysts can be extended.

In addition, during steady operation of the fuel reformer, the temperature of each section can be controlled stably without changing the total flowing amount of reforming additive water only by adjusting the ratio of the amounts of the water flowing through the reforming additive water passage 40 and the second reforming additive water passage 45.

The basic Japanese Patent Application No. 2002-28794 filed on Feb. 5, 2002 and No. 2002-161482 filed on Jun. 3, 2002 are hereby incorporated in their entirety by reference into the present application.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art within the spirit and scope of the present invention on the basis of the detailed description.

The applicant has no intention to give to public any disclosed embodiments. Among the disclosed changes and modifications, those which may not literally fall within the scope of the present claims constitute, therefore, a part of the present invention in the sense of doctrine of equivalents.

BEST MODE FOR CARRYING OUT THE INVENTION

Description is hereinafter made of embodiments of the present invention with reference to cross-sectional views illustrating the general constitution of a reformer according to the present invention.

Figure 1:
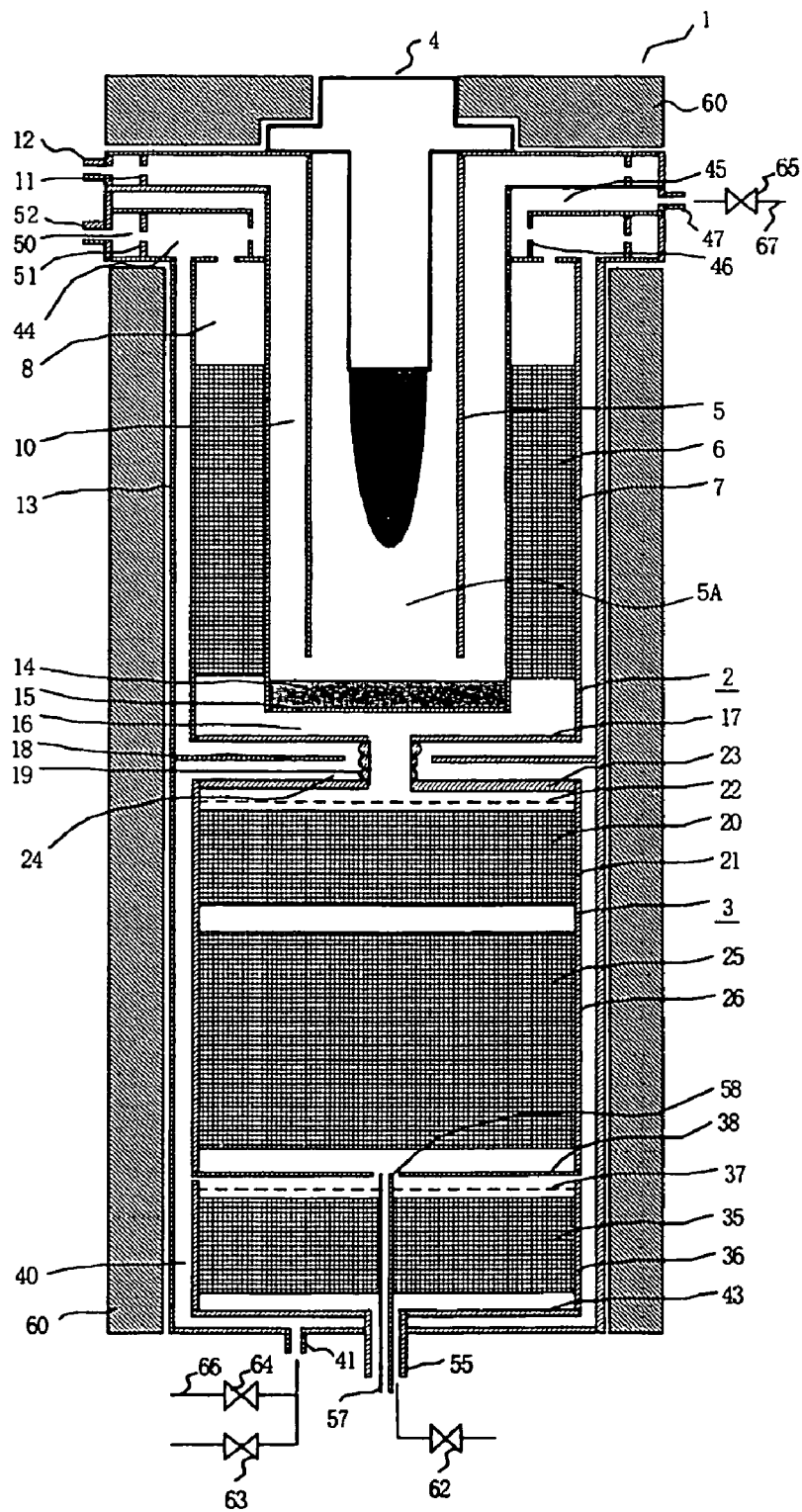
FIG. 1 is a vertical cross-sectional view illustrating a basic constitution of a first embodiment of the present invention.

FIG. 1 is a vertical cross-sectional view illustrating a fuel reformer according to a first embodiment of the present invention. As shown in the drawing, a reformer 1 has a reformer upper section 2 as a high-temperature unit and a reformer lower section 3 as a medium-low-temperature unit. The reformer upper section 2 has a burner 4 for burning fuel, a combustion cylinder 5 disposed coaxially with the burner 4, and a reforming section 7 having an annular body and housing a reforming catalyst-filled layer 6. The burner 4 is located generally on the central axis of the combustion cylinder 5. As the reforming catalyst for use in the reforming catalyst-filled layer 6, any substance can be use as long as it can accelerate a reforming reaction. For example, a Ni-based reforming catalyst or a Ru-based reforming catalyst can be used. The reforming catalyst may be in the form of particles or have a cylindrical, honeycomb or monolithic shape. A detailed illustration of the burner 4 is not given here.

A combustion chamber 5A has a peripheral wall formed by the combustion cylinder 5. A combustion gas passage 10, a baffle plate 11 and an outlet 12 are provided in a gap between the combustion cylinder 5 and the reforming section 7. A partition 15 separates the combustion gas passage 10 and a reformate passage 16 and is made of a metal material with high thermal resistance or the like. A heat insulator 14 is interposed between the combustion chamber 5A and the partition 15 to reduce the heat transmission between reformate discharged from the reforming section 7 and combustion gas. The baffle plate 11 makes the flow distribution of the combustion gas uniform in the combustion gas passage 10 and has an annular shape with a multiplicity of holes.

The reformer lower section 3 has a cylindrical first shift converter section 21 housing a first shift converter catalyst-filled layer 20, a cylindrical second shift converter section 26 housing a second shift converter catalyst-filled layer 25, and a cylindrical selective oxidation section 36 housing a selective oxidation catalyst-filled layer 35. As a first shift converter catalyst for use in the first shift converter catalyst-filled layer 20, an Fe—Cr-based high-temperature shift converter catalyst or a Pt-based medium-high-temperature shift converter catalyst, for example, can be used. As a second shift converter catalyst for use in the second shift converter catalyst-filled layer 25, a Cu—Zn-based low-temperature shift converter catalyst or a Pt-based low-temperature shift converter catalyst, for example, can be used. The catalysts for use in the first shift converter catalyst-filled layer 20 and the second shift converter catalyst-filled layer 25 may be in the form of particles or have a cylindrical, honeycomb or monolithic shape.

As a selective oxidation catalyst for use in the selective oxidation catalyst-filled layer 35, any catalyst can be used as long as it has a high CO selective oxidation capacity. For example, a Pt-based selective oxidation catalyst, Ru-based selective oxidation catalyst, or a Pt—Ru-based selective oxidation catalyst can be used. The catalysts for use in the selective oxidation catalyst-filled layer 35 may be in the form of particles or have a cylindrical, honeycomb or monolithic shape.

A connection flow pipe 19 connects a bottom 17 of the reformer upper section 2 and a top 23 of the reformer lower section 3 and made, for example, of a corrugated expandable pipe which can be expandable and contractible in its axial direction. The reformer upper section 2 is surrounded by a cylindrical tube. The bottom 17 serves like the bottom of a bucket for the reformer upper section 2 and has an opening communicated with the connection flow pipe 19 at the center. The reformer lower section 3 is surrounded by a cylindrical tube. The top 23 serves like a lid for the reformer lower section 3 and has an opening communicated with the connection flow pipe 19 at the center. The reformer lower section 3 has a bottom 43 which serves like the bottom of a bucket for the reformer lower section 3 and has an opening communicated with a reformate discharge pipe 55 at the center.

When a corrugated expandable pipe is used for the connection flow pipe 19, the bottom 17 and top 23 may be made of a material with high rigidity since the expandable pipe can deform in its axial direction to absorb the thermal expansion and contraction of the reformer upper section 2 and the reformer lower section 3. The connection flow pipe 19 is not necessarily joined to the centers of the bottom 17 and top 23 and may be joined to peripheral parts of the bottom 17 and top 23. A plurality of connection flow pipes 19 may be provided between the bottom 17 and top 23. When a straight pipe is used for the conduit part of the connection flow pipe 19, the connection flow pipe 19 should be joined to the centers of the bottom 17 and top 23 so that the thermal expansion and contraction of the reformer upper section 2 and the reformer lower section 3 can be absorbed by bending deformation of the bottom 17 and top 23. In this case, the bottom 17 and top 23 may be made of the same steel plate as other parts of the reformer upper section 2 and the reformer lower section 3. The bottom 17 and the top 23 is preferably corrugated so that they can be easily bent. In this case, a normal pipe which is not expandable can be used for the connection flow pipe 19.

A vessel 13 is a cylinder for integrally housing the reformer upper section 2 and the reformer lower section 3 connected by the connection flow pipe 19 and has a first reforming additive water injection port 41 and a reformate discharge pipe 55 at the bottom. The vessel 13 is disposed coaxially with the reformer upper section 2 and the reformer lower section 3, which have a cylindrical shape. Heat insulating layers 60 are provided on an outer periphery of the vessel 13 and on top of the reformer upper section 2. As the heat insulating layers for use as the heat insulating layers 60, vacuum heat insulating layers are preferred. A gas dispersion plate 22 is provided in a space between the reformer lower section top 23 and the first shift converter catalyst-filled layer 20. A porous plate is used as the gas dispersion plate 22 so that reformate flowing from the connection flow pipe 19 can uniformly flow into the first shift converter catalyst-filled layer 20. A gas dispersion plate 37 is provided in a space between the bottom of the second shift converter catalyst-filled layer 25 and the selective oxidation catalyst-filled layer 35 and below an annular baffle plate 38. A porous plate is used as the gas dispersion plate 37 so that reformate flowing from the central opening of the annular baffle plate 38 can uniformly flow into the selective oxidation catalyst-filled layer 35.

A first reforming additive water passage 40 is formed in a gap between outer walls of the reformer upper section 2 and the reformer lower section 3 and an inner wall of the vessel 13. The first reforming additive water passage 40 is a space with an annular cross-section since the reformer upper section 2 and reformer lower section 3 have a cylindrical shape and are disposed coaxially with the vessel 13. The first reforming additive water passage 40 may be a pipe extending through the reformer upper section 2 and reformer lower section 3 and made of a pipe material which allows heat exchange. The first reforming additive water injection port 41 is provided at the lower end of the first reforming additive water passage 40 on the side of the reformer lower section 3. Reforming additive water is supplied from a first reforming additive water injection passage 66 to the first reforming additive water passage 40 through a flow control valve 64 and the first reforming additive water injection port 41. A drain electromagnetic valve 63 is opened at start-up to allow reforming additive water or steam to flow in reverse through the first reforming additive water passage 40 and kept closed during steady operation to prevent reforming additive water supplied to the first reforming additive water passage 40 from leaking out.

A mixing chamber 44 is provided at the upper end of the reformer upper section 2, and the first reforming additive water passage 40, a second reforming additive water passage 45, a reforming material passage 50 and a reforming section inlet gas passage 8 are communicated with the mixing chamber 44. During steady operation, the mixing chamber 44 receives reforming additive water and reforming material and feeds gas formed by mixing the reforming additive water and reforming material to the reforming section 7. The second reforming additive water passage 45 is provided above the mixing chamber 44 and communicated with the mixing chamber 44, and has an annular shape, for example. The second reforming additive water passage 45 has a dispersion plate 46 and an injection port 47, and reforming additive water is supplied to the second reforming additive water passage 45 through a flow control valve 65 provided in a second reforming additive water injection passage 67. The reforming material passage 50 as a reforming material supply passage is an annular passage formed below the second reforming additive water passage 45 and communicated with the mixing chamber 44. The reforming material passage 50 is a conduit provided with a dispersion plate 51 and an injection port 52.

An annular baffle plate 18 is provided in a gap between the reformer upper section bottom 17 and the reformer lower section top 23. The baffle plate 18 disturbs the flow of reforming additive water through the first reforming additive water passage 40 to direct the flow of reforming additive water toward the connection flow pipe 19 so that heat exchange of the reforming additive water with the reformer upper section bottom 17 and the reformer lower section top 23 can be made efficiently. A heat exchanging section 24 is an annular space which is defined by the reformer upper section bottom 17, the reformer lower section top 23, the baffle plate 18 and the connection flow pipe 19 and in which reformate and first reforming additive water exchange heat.

The reformate discharge pipe 55 and a selective oxidation air introduction pipe 57 are provided at the bottom 43 of the reformer lower section 3 and have a double pipe structure. A selective oxidation air introduction port 58 is an opening provided at an end of the selective oxidation air introduction pipe 57 on the side of the gap between the second shift converter catalyst-filled layer 25 and the selective oxidation catalyst-filled layer 35 and located in the central opening of the annular baffle plate 38. An electromagnetic vale 62, which is provided at the reformate outlet of the reformate discharge pipe 55, is closed at start-up and kept opened during steady operation.

Figure 2:
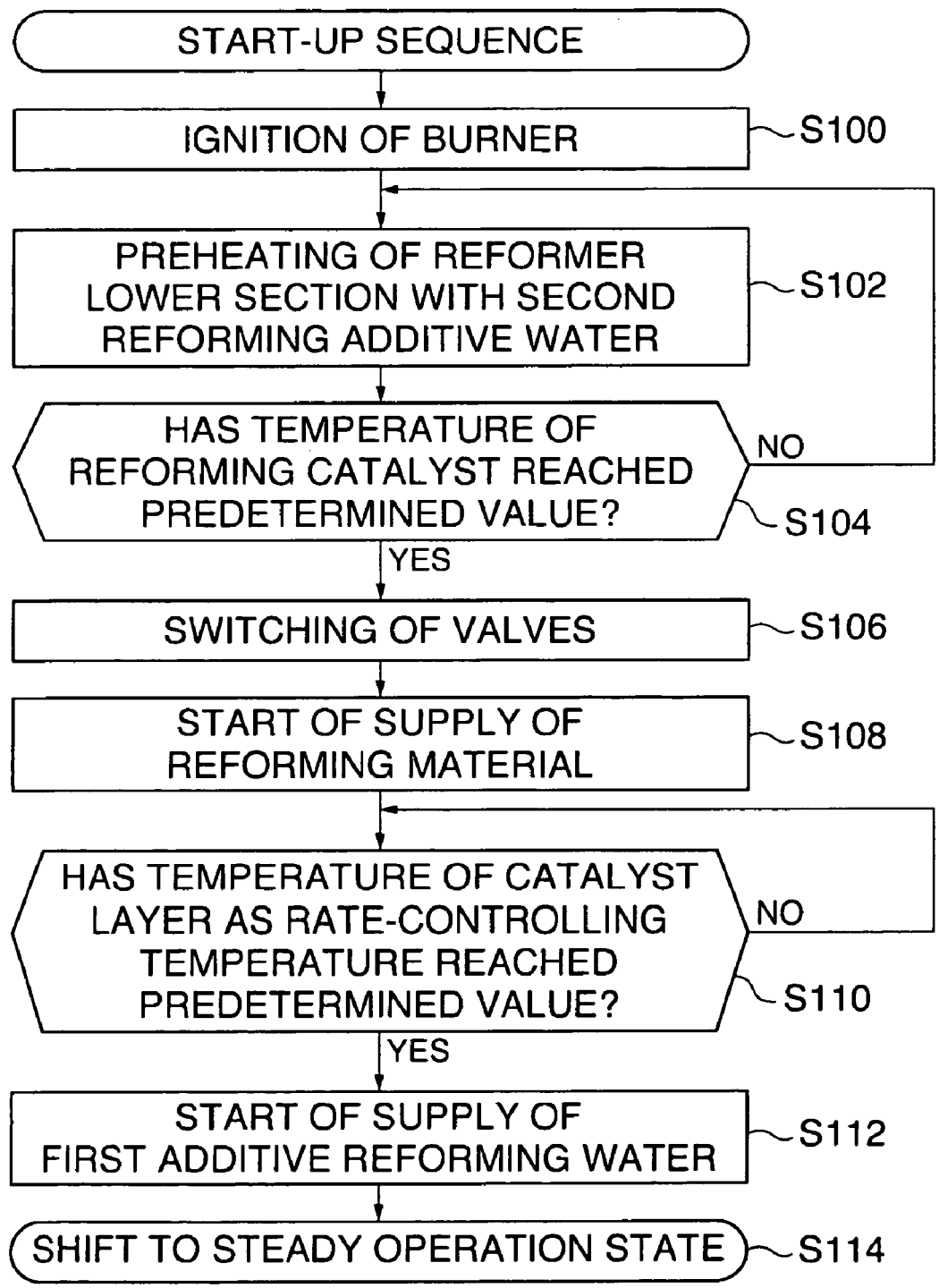
FIG. 2 is a flowchart showing the operation procedure at start-up of the device shown in FIG. 1.
Figure 3:
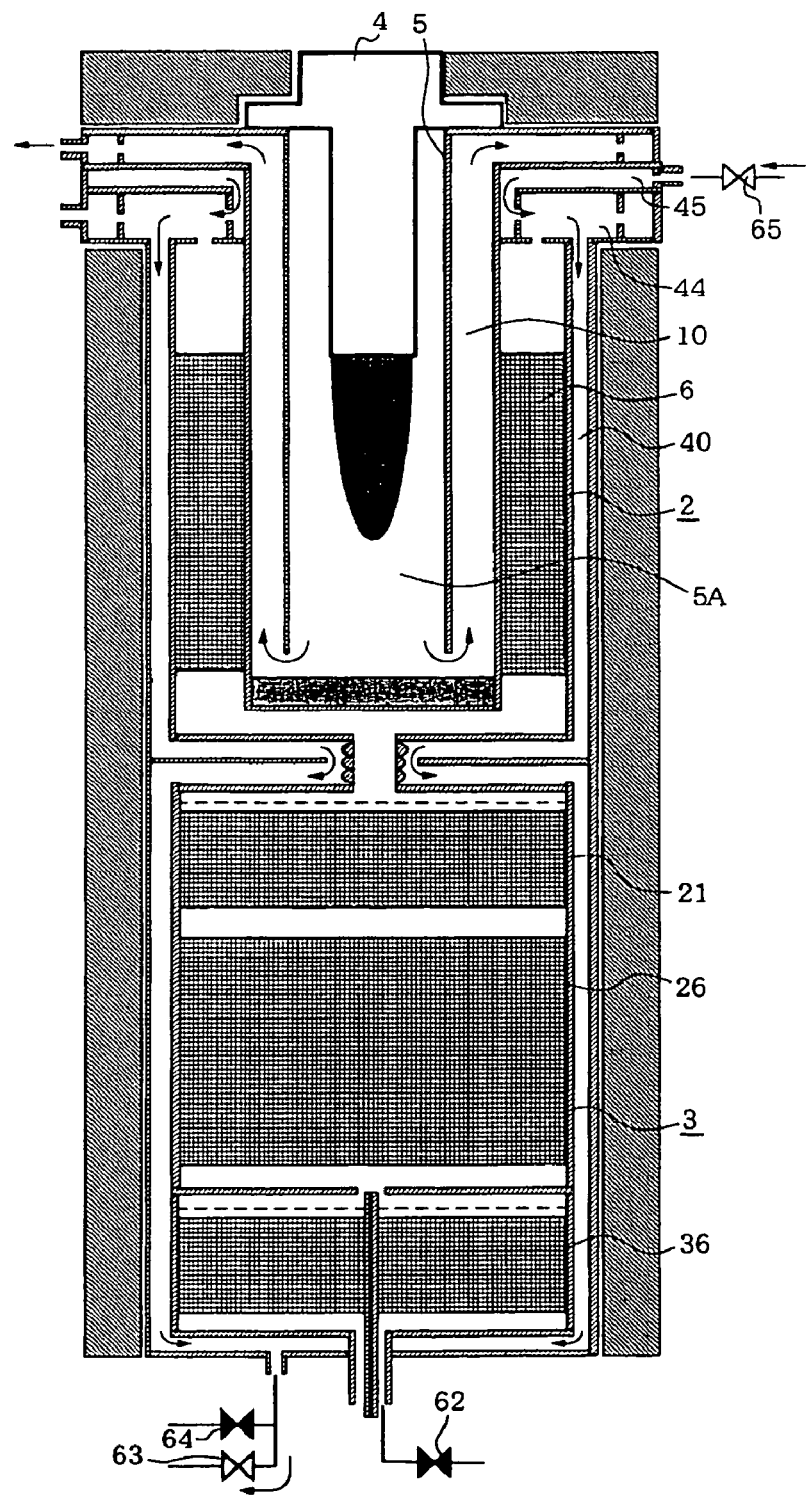
FIG. 3 is a vertical cross-sectional view illustrating the preheating state at start-up in the device shown in FIG. 1.
Figure 4:
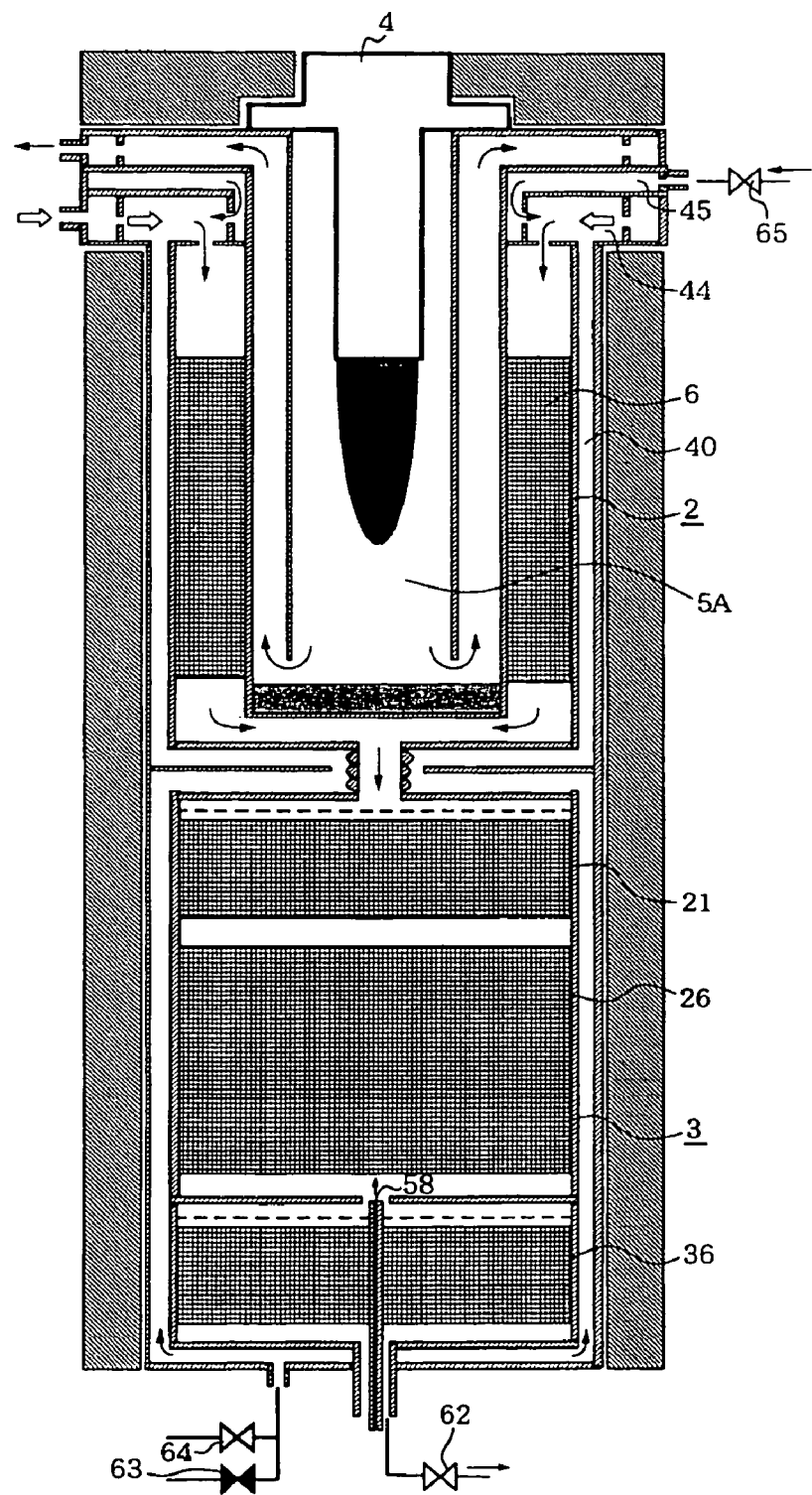
FIG. 4 is a vertical cross-sectional view illustrating the start of supply of reforming material in the device shown in FIG. 1.
Figure 5:
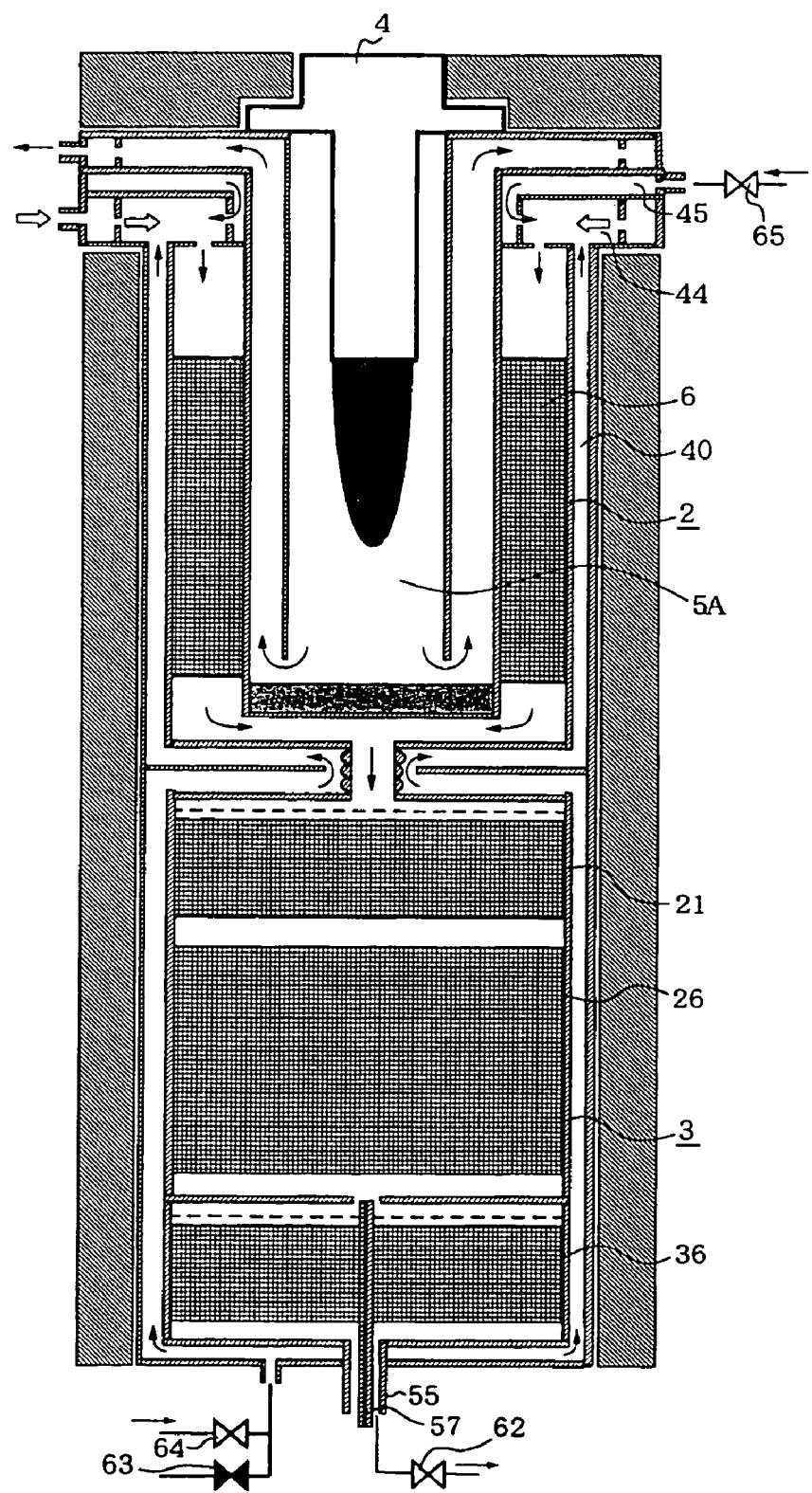
FIG. 5 is a vertical cross-sectional view illustrating the start of supply of first reforming additive water in the device shown in FIG. 1.

The operation of the fuel reformer according to the present invention is next described. FIG. 2 is a flowchart showing the operation procedure at start-up of the device shown in FIG. 1. FIG. 3 is a vertical cross-sectional view illustrating the preheating state at start-up in the device shown in FIG. 1, FIG. 4 is a vertical cross-sectional view illustrating the start of supply of reforming material in the device shown in FIG. 1, and FIG. 5 is a vertical cross-sectional view illustrating the start of supply of first reforming additive water in the device shown in FIG. 1. In FIG. 3 to FIG. 5, each of the valves 62, 63, 64 and 65 is shown in black when it is closed and in white when it is open.

First, the operation at start up is described. Combustion air is fed to the burner 4 to prepurge the burner 4, the combustion cylinder 5 and the combustion gas passage 10. Then, an ignition device is activated and, at the same time, supply of burner fuel is started to ignite the burner (S100). When ignition of the burner is confirmed, second reforming additive water as a start-up heating medium starts to be injected through the second reforming additive water injection port 47 (see FIG. 3). After the ignition, high-temperature combustion gas turns around at the bottom of the combustion cylinder 5 and passes through the combustion gas passage 10 to preheat the reforming catalyst-filled layer 6 and to evaporate and superheat the second reforming additive water as a start-up heating medium passing through the second reforming additive water passage 45 and the mixing chamber 44. Since the electromagnetic valve 62 at the reformate outlet is closed and the drain electromagnetic valve 63 in the first reforming additive water passage is opened at start-up, the generated superheated steam flows in reverse through the first reforming additive water passage 40 to preheat the reformer lower section 3 (S102). Since the reformer lower section 3 is preheated to a temperature equal to or higher than the dew point of reformate to be introduced before introduction of the reformate as described above, condensation of water in the catalyst layers at the time of introduction of the reformate can be prevented and the service lives of the catalysts can be extended. Then, it is determined whether the inlet temperature of the reforming catalyst-filled layer 6 has reached a predetermined value (S104), and the preheating of the reformer lower section 3 is continued until the inlet temperature reaches the predetermined value. The predetermined value of the inlet temperature of the reforming catalyst-filled layer 6 is preferably in the range of 450 to 550° C. although it depends on the type of the fuel to be reformed.

When the inlet temperature of the reforming catalyst-filled layer 6 reaches the predetermined value, the electromagnetic valve 62 at the reformate outlet is switched to open and the drain electromagnetic valve 63 in the first reforming additive water passage is switched to close (S106). Then, fuel as reforming material and selective oxidation air in an amount equal to approximately 30 to 50% of the amount necessary during rated load operation are supplied through the fuel injection port 52 and the selective oxidation air introduction port 58, respectively, to start reforming of fuel (S108; see FIG. 4).

When reforming of fuel is started, since the shift converter reaction and selective oxidation reaction are exothermic reactions as described later, the temperatures of the first shift converter catalyst-filled layer 20, the second shift converter catalyst-filled layer 25 and the selective oxidation catalyst-filled layer 35 are raised by the heat of reactions in them. Then, it is determined whether the temperature of a catalyst layer as a rate-controlling temperature to shift to steady operation, for example, the inlet temperature of the second shift converter catalyst-filled layer 25, which takes the longest time to raise the temperature in the device shown in FIG. 1, has reached a predetermined value (S110). The reforming of fuel with the second reforming additive water is continued until the inlet temperature of the second shift converter catalyst-filled layer 25 reaches the predetermined value. The predetermined value of the second shift converter catalyst-filled layer 25 is preferably in the range of 180 to 220° C. when a Cu—Zn-based low-temperature shift converter catalyst is used as the second shift converter catalyst.

When the inlet temperature of the second shift converter catalyst-filled layer 25 reaches the predetermined value, first reforming additive water starts to be injected through the first reforming additive water injection port 41 (S112) and the amounts of fuel and selective oxidation air to be introduced are gradually increased to rated flow rates to finish the start-up state and cause a shift to steady operation state (see FIG. 5). The reformate discharged from the outlet of the reformate discharge pipe 55 can be directed to the burner 4 and used as burner fuel. In the operation at start-up of the fuel reformer of the present invention, since a step of preheating the catalyst-filled layers in the fuel reformer is provided, the start-up time can be shortened and the starting performance can be improved. Also, according to the present invention, reforming additive water can be used as a heating medium for preheating the reformer. Thus, the reformer does not have to use a heating medium such as nitrogen like conventional reformers do, and a heating medium can be easily obtained even when the fuel reformers are separately installed in different locations.

The operating state of the fuel reformer according to the present invention during steady operation is next described.

Here, the conditions under which the first reforming additive water, the second reforming additive water and the material fuel are processed in different parts of the reformer upper section 2 and the reformer lower section 3 are described with reference to FIG. 1 and FIG. 5. The first reforming additive water injected through the first reforming additive water injection port 41 flows through the first reforming additive water passage 40 in a direction counter to the reformate flowing through the reformer lower section 3. The first reforming additive water flowing through the first reforming additive water passage 40 is evaporated as it cools the selective oxidation section 36, the second shift converter section 26 and the first shift converter section 21, superheated by high-temperature reformate discharged from the reforming section 7 in the heat exchanging section 24, and directed to the mixing chamber 44. In the mixing chamber 44, the reforming material injected through the fuel injection port 52 is evaporated by the superheated steam produced from the first reforming additive water when the reforming material is a liquid fuel such as kerosene or preheated when it is a gas fuel such as city gas. Since the superheated steam produced from the first reforming additive water can have a temperature in the range of, for example, 400 to 600° C. when it enters the mixing chamber 44, the superheated steam has sufficiently high ability as a heat source to evaporate or preheat the fuel.

The second reforming additive water injected through the second reforming additive water injection port 47 is heated and evaporated by the combustion gas while it is flowing through the second reforming additive water passage 45, joins mixed gas of the second reforming additive water and the reforming material in the mixing chamber 44, and is directed to the reforming catalyst-filled layer 6 through the reforming section inlet gas passage 8.

In the reforming catalyst-filled layer 6, a reforming reaction of fuel with steam is carried out mainly. For example, when the reforming fuel is methane, a reforming reaction with steam as represented by the following chemical formula occurs.

$$CH_4 + H_2O \rightarrow CO + 3H_2 \qquad (1)$$

Since a reforming reaction of a hydrocarbon with steam is an endothermic reaction, the higher the reaction temperature is, the higher the reforming rate of the hydrocarbon and the higher the reaction rate will be. However, when the temperature is excessively high, the requirements for the thermal resistance of the materials for the reformer will be too severe, and the thermal efficiency tends to be lowered because of an increase in heat diffusion from the reformer. Thus, the temperature distribution in the reforming catalyst-filled layer 6 can be made to range from 550 to 800° C., for example, in the gas flowing direction, and the optimum temperature distribution can be further limited appropriately depending on the type of the reforming material. Also, the more the amount of additive steam for the reaction is, the higher the reforming rate will be. However, since the thermal efficiency is decreased because the amount of heat needed to generate the steam increases. Thus, an S/C in the range of 2.2 to 3.5 is preferred. The supply of heat for the reforming reaction to the reforming catalyst-filled layer 6 is made by transferring the heat generated by combustion of the burner fuel in the combustion chamber 5A as a heat source through heat radiation from the combustion cylinder 5 and heat transfer from the combustion gas passing through the combustion gas passage 10.

The reformate discharged from the reforming section 7 is lowered in temperature in the heat exchanging section 24 and then, directed to the first shift converter section 21 and the second shift converter section 26, where a shift converter reaction represented by the following chemical formula occurs.

$$CO + H_2O \rightarrow CO_2 + H_2 \qquad (2)$$

Since the shift converter reaction is an exothermic reaction, when the reaction temperature is lowered, there is an advantage that the concentration of CO in the reformate after the shift conversion can be lowered and a disadvantage that the reaction rate decreases.

Therefore, in this embodiment, the first shift converter section 21 with a relatively high reaction temperature and the second shift converter section 26 with a low reaction temperature are provided. Since the reaction rate can be high in the first shift converter section 21 and the concentration of CO in the reformate can be low in the second shift converter section 26, the efficiency of the shift converter reaction can be improved as a whole. The temperature distribution in the first shift converter catalyst-filled layer 20 ranges, for example, from 500 to 280° C., preferably from 450 to 300° C., in the gas flowing direction. The temperature distribution in the second shift converter catalyst-filled layer 25 ranges, for example, from 280 to 170° C., preferably from 250 to 190° C., in the gas flowing direction. The concentration of CO in the reformate is approximately 10% at the inlet of the first shift converter catalyst-filled layer 20, approximately 3 to 5% at the inlet of the second shift converter catalyst-filled layer 25, and approximately 0.3 to 1% at the outlet of the second shift converter catalyst-filled layer 25. By optimizing the temperature distributions in the shift converter catalyst-filled layers as described above, the residual CO concentration in the reformate after shift conversion can be decreased. In addition, the entire amounts of the shift converter catalysts to be filled can be small, and the reformer can be reduced in size and manufacturing cost.

The reformate discharged from the second shift converter section 26 is directed to the selective oxidation section 36 and undergoes a CO selective oxidation reaction with selective oxidation air introduced through the selective oxidation air introduction port 58 represented by the following chemical formula.

$$CO + (1/2)O_2 \rightarrow CO_2 \qquad (3)$$

Since oxygen in the selective oxidation air oxidizes and consumes hydrogen in the reformate as well as oxidizes and removes CO in the reformate as represented by the chemical formula (3), it is important to suppress the oxidation reaction between oxygen and hydrogen in order to improve hydrogen production efficiency, that is, the thermal efficiency, of the reformer.

In this embodiment, the annular baffle plate 38 is provided in a gap between the second shift converter section 26 and the selective oxidation section 36 and the selective oxidation air introduction port 58 is located in the central opening of the baffle plate 38 so that the reformate and the selective oxidation air can be mixed uniformly. The temperature distribution in the selective oxidation catalyst-filled layer 35 ranges, for example, from 200 to 100° C., preferably from 150 to 110° C., in the gas flowing direction. The amount of the selective oxidation air to be introduced is determined, for example, such that the residual CO concentration in the reformate can be 100 ppm or less, preferably 10 ppm or less, after the selective oxidation. To improve the hydrogen production efficiency of the reformer, the molar ratio ($O_2/CO$) of oxygen in the selective oxidation air to CO in the reformate to be introduced into the selective oxidation section 36 is, for example, in the range of 1.2 to 3.0, preferably 1.2 to 1.8.

By optimizing the temperature distribution in the selective oxidation catalyst-filled layer 35 and fully mixing the reformate and the selective oxidation air, the residual CO concentration in the reformate after the selective oxidation can be reduced and the consumption of hydrogen can be reduced to improve the thermal efficiency of the reformer.

Although only one selective oxidation section 36 is provided in the first embodiment as described above, two selective oxidation sections 36 may be provided. For example, a second selective oxidation section may be provided below the selective oxidation section 36 shown in FIG. 1 or a second selective oxidation device may be provided at the downstream of the reformer 7.

The reformate discharged from the selective oxidation section 36 after the selective oxidation can be obtained from the outlet of the reformate discharge pipe 55, and the obtained reformate can be supplied to a fuel cell for generation of electricity (detailed illustration of a fuel cell is not given). In general, in the case of a fuel cell using reformate shift-converted from a hydrocarbon as fuel, 70 to 80% of hydrogen in the reformate is consumed and the residual hydrogen is discharged as anode off gas. According to the first embodiment, the anode off gas from the fuel cell can be used as the burner fuel.

Also in the above embodiment, the burner 4 may be a single-fuel burner which uses only anode off gas as burner fuel during steady operation or a multi-fuel burner which uses reforming material as auxiliary fuel in addition to anode off gas. The combustion gas generated from the combustion in the burner 4 flows downward through the combustion cylinder 5, turns around at a lower part of the combustion cylinder 5, flows upward through the combustion gas passage 10, passes through the baffle plate 11 and is discharged from the combustion gas outlet 12.

Figure 6:
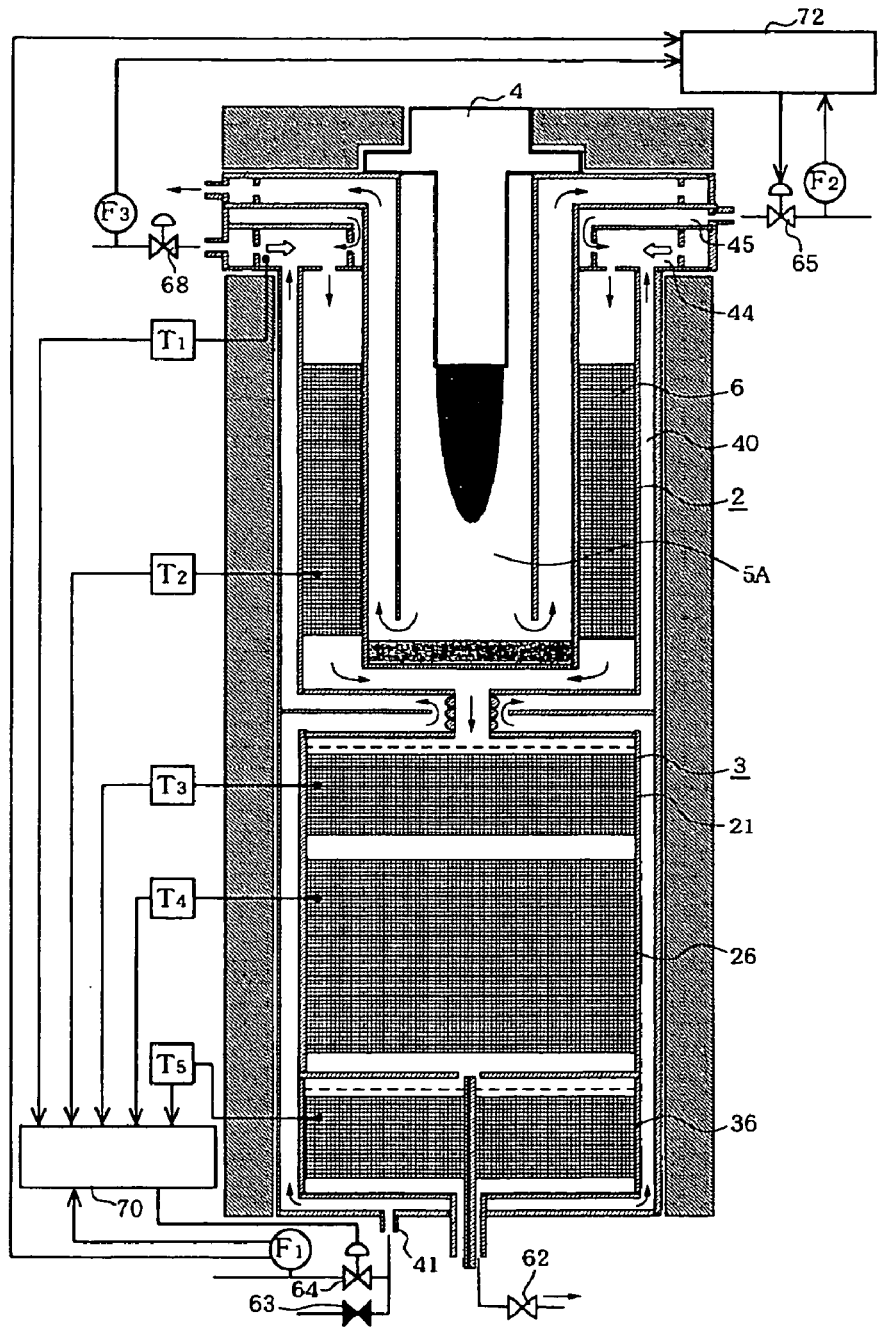
FIG. 6 is a constitutional block diagram illustrating a second embodiment of the present invention.

FIG. 6 is a constitutional block diagram illustrating a second embodiment of the present invention. In the second embodiment, a first reforming additive water flow rate control section 70 and a second reforming additive water flow rate control section 72 are provided so that the operation of the fuel reformer shown in FIG. 1 under steady conditions can be improved. The first reforming additive water flow rate control section 70 has thermometers T1 to T5 such as thermocouples for measuring the temperatures of different parts of the reformer upper section 2 and the reformer lower section 3 as input instruments, and a first flow meter F1 for measuring the flow rate of the first reforming additive water flowing through the first reforming additive water passage 40, and transmits a valve opening signal to the flow control valve 64. In the reformer upper section 2, a first thermometer T1 for measuring the temperature of the first reforming additive water in the vicinity of the mixing chamber 44 and a second thermometer T2 for measuring the temperature of the reforming section 7 are provided. In the reformer lower section 3, a third thermometer T3 for measuring the temperature of the first shift converter section 21, a fourth thermometer T4 for measuring the temperature of the second shift converter section 26 and a fifth thermometer T5 for measuring the temperature of the selective oxidation section 36 are provided.

The second reforming additive water flow rate control section 72 has a first flow meter F1 for measuring the flow rate of the first reforming additive water flowing through the first reforming additive water passage 40, a second flow meter F2 for measuring the flow rate of the second reforming additive water flowing through the second reforming additive water passage 45, and a third flow meter F3 for measuring the flow rate of the reforming material flowing through the reforming material passage 50 as input instruments, and transmits a valve opening signal to the flow control valve 65.

The first reforming additive water flow rate control section 70 measures the temperatures of the different parts of the reformer upper section 2 and the reformer lower section 3 with the first to fifth thermometers T1 to T5, and closes the flow control valve 64 to reduce the flow rate of the first reforming additive water when any of the temperatures become lower than preset values for each part. Then, the temperatures of the parts such as the first shift converter section 21 are raised, and maintained at the preset value by feedback control of the first reforming additive water flow rate control section 70. The second reforming additive water flow rate control section 72 calculates the amount of carbon in the reforming material to be reformed based on a flow rate signal from the third flow meter F3, for example, and the composition of the reforming material, and calculates the amount of reforming additive water at a specific ratio to the calculated amount of carbon (the molar ratio of the reforming additive water to the carbon in the reforming material is hereinafter represented as "S/C" (steam/carbon)). Then, the second reforming additive water flow rate control section 72 subtracts the amount of first reforming additive water measured by the first flow meter F1 from the calculated amount of reforming additive water to obtain the amount of water to be supplied as the second reforming additive water, and transmits a valve opening signal to the flow control valve 65 to control the flow rate of the second reforming additive water measured by the second flow meter F2 to correspond to the calculated amount of water to be supplied.

According to this embodiment, since the second reforming additive water flow rate control section 72 is provided, the ratio of the flow rates of the first reforming additive water and the second reforming additive water can be adjusted during steady operation of the reformer without changing the total flowing amount of the reforming additive water, that is, the S/C. Thus, the first reforming additive water flow rate control section 70 can control the temperature of each section stably. For example, when the temperature distribution in the first shift converter section 21 is shifted to the high-temperature side for some reason, the first reforming additive water flow rate control section 70 and the second reforming additive water flow rate control section 72 cooperate with each other to return the temperature distribution in the first shift converter section 21 to an appropriate temperature distribution by operating the flow control valve 64 in the first reforming additive water injection passage 66 and the flow control valve 65 in the second reforming additive water injection passage 67 to decrease the flow rate of the second reforming additive water as needed and to increase the flow rate of the first reforming additive water. Therefore, an optimum S/C can be achieved at every operating load and the thermal efficiency in the reforming process can be improved.

Figure 7:
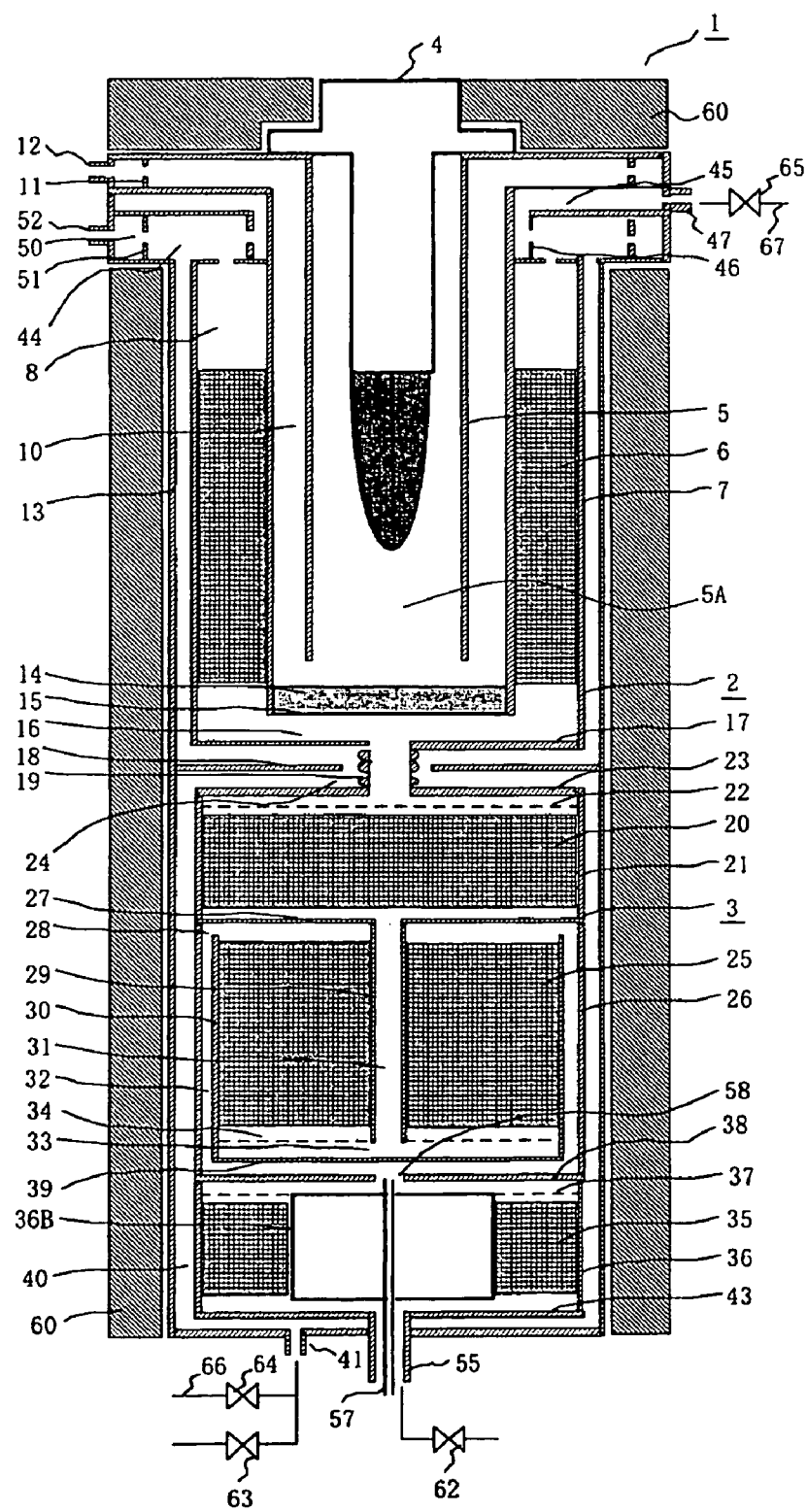
FIG. 7 is a vertical cross-sectional view illustrating a third embodiment of the present invention.

Description is hereinafter made of a third embodiment of the fuel reformer according to the present invention. FIG. 7 is a vertical cross-sectional view of a fuel reformer according to the third embodiment. Those parts equivalent to or corresponding to the components of FIG. 1 are identified with the same numerals in FIG. 7, and redundant description is omitted.

As shown in the drawing, an inner cylinder 29 and an intermediate cylinder 30 are disposed coaxially with an outer wall of the reformer lower section 3 in the second reforming section 26, and the inner cylinder 29 is located on the center side and the intermediate cylinder 30 is located on the outer peripheral side. A gas introduction passage 31 is a space formed on the center side of the inner cylinder 29, and an opening of an annular baffle plate 27 is connected to the end of the inner cylinder 29 on the side of the first shift converter section 21. A second shift converter catalyst-filled layer 25 is a space formed between the outer peripheral side of the inner cylinder 29 and the center side of the intermediate cylinder 30 and is filled with a second shift converter catalyst. A gas discharge passage 32 is a space defined by the outer peripheral side of the intermediate cylinder 30, an outer wall of the reformer lower section 3, the annular baffle plate 27 disposed in a gap between the first shift converter section 21 and the second shift converter section 26, and a bottom 39 of the second shift converter section 26. The gas introduction passage 31 and the second shift converter catalyst-filled layer 25 are communicated with each other via a lower end opening 33 of the inner cylinder 29 as a first opening. The second shift converter catalyst-filled layer 25 and the gas discharge passage 32 are communicated with each other via an upper end opening 28 of the intermediate cylinder 30 as a second opening.

In the second shift converter section 26 constituted as described above, the reformate discharged from the first shift converter section 21 flows downward through the gas introduction passage 31, turns around at the lower end opening 33 of the inner cylinder 29, and flows upward through the second shift converter catalyst-filled layer 25. The reformate discharged from the second shift converter catalyst-filled layer 25 turns around at the upper end opening 28 of the intermediate cylinder 30, and flows downward through the gas discharge passage 32 to the selective oxidation section 36. A cylindrical hollow section 36B through which reformate cannot pass is provided at the center of the selective oxidation section 36. Since the cylindrical hollow section 36B is provided, the amount of catalyst to be filled in the selective oxidation section 36 and the temperature distribution in the selective oxidation section 36 can be optimized. As a result, the temperature distributions in the shift converter sections and the selective oxidation section of the fuel reformer according to this embodiment can be optimized and the performance of the reformer can be improved even further.

The operation of the fuel reformer according to this embodiment is the same as that of the first embodiment described before, and hence its description is omitted.

Figure 8:
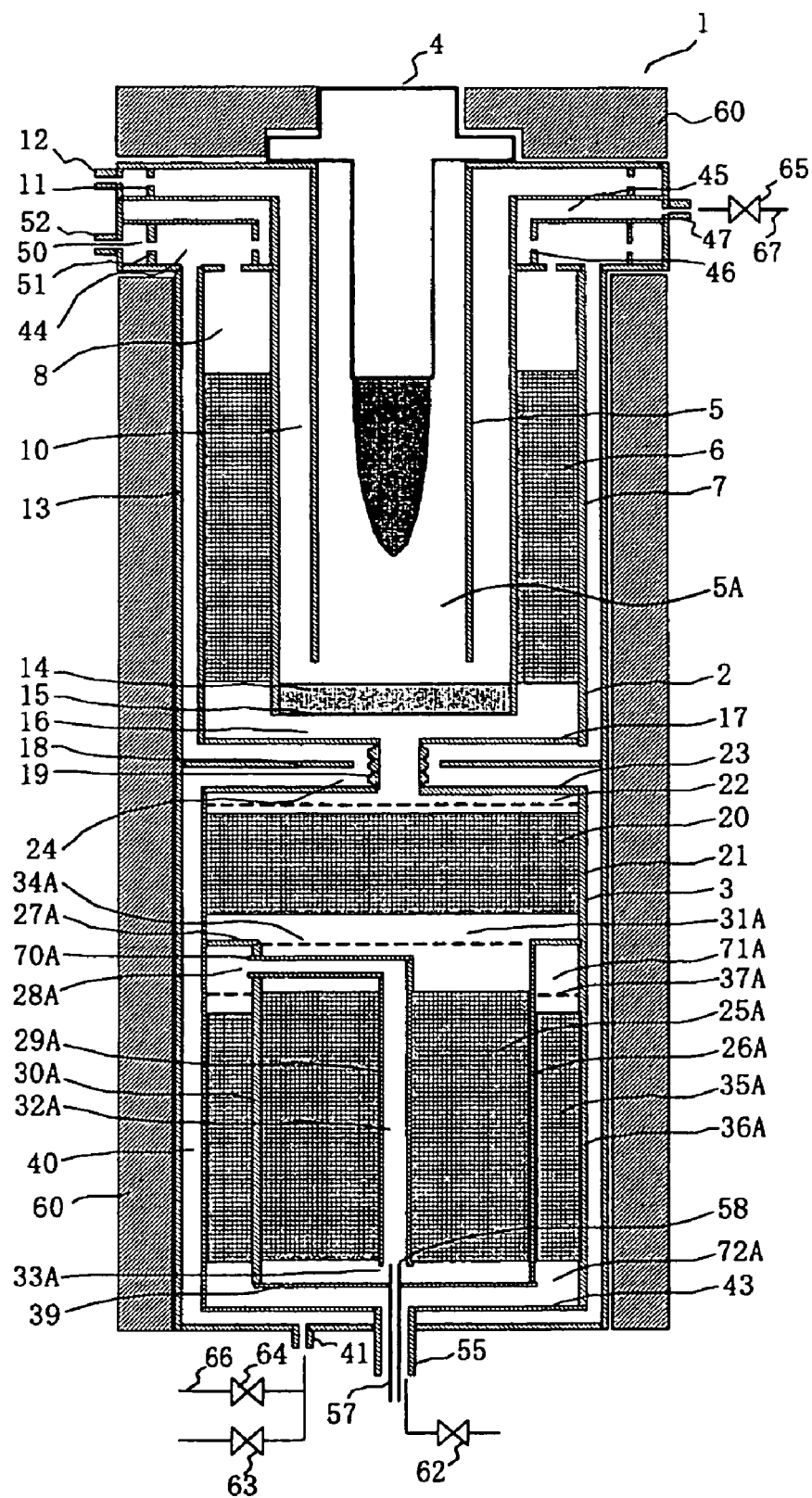
FIG. 8 is a vertical cross-sectional view illustrating a fourth embodiment of the present invention.

Description is hereinafter made of a fourth embodiment of the fuel reformer according to the present invention. FIG. 8 is a vertical cross-sectional view of a fuel reformer according to the fourth embodiment. Those parts equivalent to or corresponding to the components of FIG. 1 are identified with the same numerals in FIG. 8, and redundant description is omitted. As shown in the drawing, the medium-low-temperature unit 3 has a first shift converter section 21 filled with a first shift converter catalyst in a cylindrical shape, a second shift converter section 26A filled with a second shift converter catalyst in an annular shape, and a selective oxidation section 36A located coaxially around an outer periphery of the second shift converter section 26A.

The second shift converter section 26A has an inner cylinder 29A disposed coaxially with an outer wall of the medium-low-temperature unit 3, and an intermediate cylinder 30A disposed coaxially with the outer wall of the medium-low-temperature unit 3 and on the outer peripheral side of the inner cylinder 29A. A catalyst-filled layer 25A of the second shift converter section 26A is an annular space housing a second shift converter catalyst and is defined by an outer peripheral surface of the inner cylinder 29A and an inner peripheral surface of the intermediate cylinder 30A. An annular baffle plate 27A is disposed in a gap between the first shift converter section 21 and the second shift converter section 26A and has a gas dispersion plate 34A at its center.

A gas introduction passage 31A is a space defined by the annular baffle plate 27A, an inner peripheral surface, on the side of the first shift converter section 21, of the intermediate cylinder 30A located inside the selective oxidation section 36A, and an outer peripheral surface of the inner cylinder 29 on the side of the first shift converter section 21, and is a passage through which the reformate having passed through the first shift converter section 21 is introduced into the second shift converter section 26A. A gas discharge passage 32A is a space defined by an inner peripheral surface of the intermediate cylinder 30A on the side of the bottom 43, a bottom 39 of the second shift converter section 26A, an inner peripheral surface of the inner cylinder 29A, and a conduit 70A communicated with a part of the selective oxidation section 36A facing the first shift converter section 21, and is a passage through which the reformate having passed through the second shift converter section 26A is introduced into the selective oxidation section 36A. The conduit 70A is a tube with a circular or rectangular cross-section connected to an end of the inner cylinder 29A and extending through the intermediate cylinder 30A and has a diameter not to disturb the flow through the gas introduction passage 31A. The conduit 70A has a second opening 28A on the side of a gas introduction passage 71A. A first opening 33A is formed at an end of the inner cylinder 29 on the side of the bottom 39 of the intermediate cylinder 30A. A selective oxidation air introduction port 58 is located in the vicinity of the first opening 33A, and, preferably, slightly inserted into the first opening 33A. Since the selective oxidation air introduction port 58 is located in the vicinity of the first opening 33A, the reformate shift-converted in the second shift converter section 26A and the selective oxidation air are properly mixed and the selective oxidation reaction proceeds effectively in the selective oxidation section 36A.

The selective oxidation section 36A has a selective oxidation catalyst-filled layer 35A defined by an inner peripheral surface of the low-medium temperature unit 3 and an outer peripheral surface of the intermediate cylinder 30A, and also has a gas introduction passage 71A and a gas discharge passage 72A. The gas introduction passage 71A is a space defined by an inner peripheral surface of the low-medium temperature unit 3, an outer peripheral surface of the intermediate cylinder 30A and the annular baffle plate 27A and directs the reformate having passed through the second shift converter section 26A to the selective oxidation catalyst-filled layer 35A. A gas dispersion plate 37A is provided in the gas introduction passage 71A for making the gas flow uniform. The gas discharge passage 72A is a space defined by an inner peripheral surface of the medium-low-temperature unit 3, an outer peripheral surface of the intermediate cylinder 30A, the bottom 39 of the second shift converter section 26A, the bottom 43 of the medium-low-temperature unit 3, and an inner peripheral surface of the reformate discharge pipe 55 and can direct the reformate having passed through the selective oxidation catalyst-filled layer 35A to the reformate discharge pipe 55.

In the second shift converter section 26A constituted as described above, the reformate having passed through the first shift converter section 21 flows downward through the gas introduction passage 31A and the gas dispersion plate 34A and then passes through the catalyst-filled layer 25A. The reformate having passed through the second shift converter catalyst-filled layer 25A turns around at the first opening 33A, flows upward through the gas discharge passage 32A, passes through the second opening 28A and is directed to the selective oxidation section 36A through the gas introduction passage 71A. That is, the reformate having passed through the second shift converter section 26A passes through the gas introduction passage 71A and the gas dispersion plate 37A, flows downward through the selective oxidation catalyst-filled layer 35A and is directed to the outside of the system through the gas discharge passage 72A.

When the second shift converter section 26A and the selective oxidation section 36A are disposed concentrically with each other as described above, the second shift converter section 26A is located at the center where a large amount of reformate tends to flow. Thus, since the reformate flows uniformly through the selective oxidation section 36A located around an outer periphery of the second shift converter section 26A, a selective oxidation reaction proceeds uniformly. Therefore, the amount of selective oxidation catalyst to be filled in the selective oxidation section 36A can be optimized and the temperature distribution in the selective oxidation section 36A can be optimized.

Although a fuel reformer in which the reformer upper section 2 as a high-temperature unit is located on the upper side and the reformer lower section 3 as a medium-low-temperature unit is located on the lower side is described in the first to fourth embodiments, the present invention is not limited thereto. The fuel reformer can be used upside-down.

Although a case where the annular baffle plate 18 is provided in a gap at the joint between the reformer upper section 2 and the reformer lower section 3, and the heat exchanging section 24, in which the reformate and the reforming water exchange heat, is defined by the bottom of the reformer upper section 2, the top of the reformer lower section 3 and the connection flow pipe 19 is shown in the first to fourth embodiments, the present invention is not limited thereto. Briefly speaking, all that is necessary is that the first reforming additive water can be evaporated and superheated and an optimum temperature distribution can be achieved in every part of the fuel reformer.

For example, the bottom of the first shift converter section 21 and the top of the second shift converter section 26 may be connected by a connection flow pipe with an annular baffle plate provided in a gap at the joint therebetween to form a second heat exchanging section in which the reformate and the first reforming additive water can exchange heat through the bottom of the first shift converter section 21, the top of the second shift converter section 26 and the connection flow pipe. In addition, the bottom of the second shift converter section 26 and the top of the selective oxidation section 36 may be connected by a connection flow pipe with an annular baffle plate provided in a gap at the joint therebetween to form a third heat exchanging section in which the reformate and the first reforming additive water can exchange heat through the bottom of the second shift converter section 26, the top of the selective oxidation section 36 and the connection flow pipe. When the third heat exchanging section is provided, an introduction port for the selective oxidation air may be provided in the connection flow pipe connecting the bottom of the second shift converter section 26 and the top of the selective oxidation section 36.

INDUSTRIAL APPLICABILITY

The fuel reformer according to the present invention has: a high-temperature unit having a combustion chamber in which fuel is burned, and a reforming section disposed on the outer peripheral surface side of the combustion chamber and filled with a reforming catalyst in an annular shape; and a medium-low-temperature unit having a shift converter section located on the side where the medium-low-temperature unit is connected to the high-temperature unit and filled with a shift converter catalyst in a cylindrical or annular shape, and a selective oxidation section located on the side opposite the side where the medium-low-temperature unit is connected to the high-temperature unit and filled with a selective oxidation catalyst in a cylindrical or annular shape. Since the fuel reformer is largely divided into two sections, high-temperature unit and low-temperature unit, the structure of the integrated fuel reformer can be simplified, the manufacturing cost can be reduced and the thermal efficiency can be improved.

The fuel reformer according to the present invention also has a connection flow pipe for supplying reformate having passed through the reforming section in the high-temperature unit to the shift converter section side in the medium-low-temperature unit; and a vessel for integrally housing the high-temperature unit and the medium-low-temperature unit connected by the connection flow pipe. Thus, the generation of thermal stress can be significantly reduced and the durability of the fuel reformer can be improved.

The fuel reformer according to the present invention may also have a reforming additive water passage formed in a gap between outer walls of the high-temperature unit and the medium-low-temperature unit and an inner wall of the vessel; a reforming material supply passage for supplying reforming material to the high-temperature unit; and a mixing chamber communicating the reforming additive water passage and the reforming material supply passage. Then, the reforming additive water can be evaporated and superheated by the sensible heat of the reformate through heat exchange between the reforming additive water supply passage and the high- and medium-low-temperature units, and the fuel can be preheated when the fuel is a gas fuel or fuel can be evaporated when the fuel is a liquid fuel in the mixing chamber using the high-temperature superheated steam generated from the reforming additive water. Therefore, the fuel reformer of the present invention is applicable to both gas fuels such as city gas, LPG, and anaerobic digestion gas and liquid fuels such as kerosene and naphtha.

The fuel reformer according to the present invention may also have a reforming material supply passage for supplying reforming material to the high-temperature unit; a second reforming additive water passage for supplying reforming additive water directly to the high-temperature unit, not through the medium-low-temperature unit; and a mixing chamber communicating the reforming additive water passage, the reforming material supply passage and the second reforming additive water passage. Then, the start-up time can be significantly shortened and the temperature of each reaction section can be controlled easily.

In the fuel reformer according to the present invention, the medium-low temperature unit may have a shift converter section having a first shift converter section located on the side of the high-temperature unit and filled with a first shift converter catalyst in a cylindrical or annular shape, and a second shift converter section filled with a second shift converter catalyst in a cylindrical or annular shape and if the second shift converter section is disposed coaxially with the selective oxidation section, then the second shift converter section and the selective oxidation section are arranged concentrically with each, other and the reformer can be compact as a whole.

The invention claimed is:
1. A fuel reformer, comprising:
a high-temperature unit having a combustion chamber in which fuel is burned, and a reforming section disposed on an outer peripheral surface side of the combustion chamber, surrounding the combustion chamber and filled with a reforming catalyst in an annular shape;

a medium-low-temperature unit having a shift converter section located on a side where the medium-low-temperature unit is connected to the high-temperature unit and filled with a shift converter catalyst in a cylindrical or annular shape, and a selective oxidation section located on a side opposite the side where the medium-low-temperature unit is connected to the high-temperature unit and filled with a selective oxidation catalyst in a cylindrical or annular shape;

a connection flow pipe for supplying reformate having passed through the reforming section of the high-temperature unit to the shift converter section side in the medium-low-temperature unit;

a vessel for integrally housing the high-temperature unit and the medium-low-temperature unit connected by the connection flow pipe;

a reforming additive water passage formed in a gap between outer walls of the high-temperature unit and the medium-low-temperature unit and an inner wall of the vessel;

a reforming additive water injection port provided at an end of the reforming additive water passage on a side opposite the side where the medium-low-temperature unit is connected to the high-temperature unit;

a reforming material supply passage for supplying reforming material to the high-temperature unit;

a second reforming additive water passage for supplying reforming additive water directly to the high-temperature unit, not through the medium-low-temperature unit; and a mixing chamber communicating the reforming additive water passage, the reforming material supply passage and the second reforming additive water passage.

2. The fuel reformer of claim 1, further comprising:

a baffle plate provided in a gap at a joint between the high-temperature unit and the medium-low-temperature unit; and a heat exchanging section provided between opposite faces of the high-temperature unit and the medium-low-temperature unit for exchanging heat between reformate flowing from the high-temperature unit to the medium-low-temperature unit and the reforming additive water.

3. The fuel reformer of claim 1, wherein the connection flow pipe has an expandable member expandable and contractible in the axial direction of the connection flow pipe.

4. The fuel reformer of claim 2, wherein the connection flow pipe has an expandable member expandable and contractible in the axial direction of the connection flow pipe.

5. The fuel reformer claim 1, wherein the shift converter section has a first shift converter section located on a side of the high-temperature unit and filled with a first shift converter catalyst in a cylindrical or annular shape, and a second shift converter section located on a side of the selective oxidation section and filled with a second shift converter catalyst in a cylindrical or annular shape.

6. The fuel reformer claim 2, wherein the shift converter section has a first shift converter section located on a side of the high-temperature unit and filled with a first shift converter catalyst in a cylindrical or annular shape, and a second shift converter section located on a side of the selective oxidation section and filled with a second shift converter catalyst in a cylindrical or annular shape.

7. The fuel reformer of claim 5, wherein the second shift converter section has: an inner cylinder disposed coaxially with an outer wall of the medium-low-temperature unit; and an intermediate cylinder disposed coaxially with an outer wall of the medium-low-temperature unit and on the outer peripheral side of the inner cylinder, and wherein a gas introduction passage for the reformate having passed through the first shift converter section is defined by an inner peripheral surface of the inner cylinder, a catalyst filled-layer of the second shift converter section is defined by an outer peripheral surface of the inner cylinder and an inner peripheral surface of the intermediate cylinder, and a gas discharge passage is defined by an outer peripheral surface of the intermediate cylinder and an inner peripheral surface of the medium-low-temperature unit.

8. The fuel reformer of claim 7, wherein the second shift converter section also has: a first opening communicating the gas introduction passage and the catalyst filled-layer of the second shift converter section, and disposed at the inner cylinder on the side of the selective oxidation section; and a second opening communicating the catalyst filled-layer of the second shift converter section and the gas discharge passage, and disposed at the intermediate cylinder on the side of the first shift converter section.

9. The fuel reformer of claim 1, comprising a baffle plate in a gap between the shift converter section and the selective oxidation section, wherein a selective oxidation air introduction port is located in an opening at a center of the baffle plate.

10. The fuel reformer of claim 2, comprising a baffle plate in a gap between the shift converter section and the selective oxidation section, wherein a selective oxidation air introduction port is located in an opening at a center of the baffle plate.

11. The fuel reformer of claim 1, wherein the selective oxidation section has a cylindrical hollow section through which the reformate flowing from the shift converter section cannot pass in a vicinity of a center thereof.

12. The fuel reformer of claim 1, wherein the medium-low-temperature unit has a shift converter section having a first shift converter section located on a side of the high-temperature unit and filled with a first shift converter catalyst in a cylindrical or annular shape and a second shift converter section filled with a second shift converter catalyst in a cylindrical or annular shape and disposed coaxially with the selective oxidation section.

13. The fuel reformer of claim 12, wherein the second shift converter section has: an inner cylinder disposed coaxially with an outer wall of the medium-low-temperature unit; and an intermediate cylinder disposed coaxially with the outer wall of the medium-low-temperature unit and on the outer peripheral side of the inner cylinder, and wherein there are further provided: a catalyst-filled layer of the second shift converter section provided in a space defined by an outer peripheral surface of the inner cylinder and an inner peripheral surface of the intermediate cylinder; a selective oxidation catalyst-filled layer of the selective oxidation section in a space defined by an outer peripheral surface of the intermediate cylinder and an inner peripheral surface of the medium-low-temperature unit; a gas introduction passage formed between opposite faces of the first shift converter section and the second shift converter section for feeding the reformate having passed through the first shift converter section to the second shift converter section; and a gas discharge passage for the reformate having passed through the second shift converter section communicating the bottom side of the second shift converter section and a part of the selective oxidation section facing the first shift converter section.

14. The fuel reformer of claim 13, further comprising
a baffle plate disposed between opposite faces of the first shift converter section and the second shift converter section,
wherein the gas introduction passage is defined by the baffle plate, an inner peripheral surface of the intermediate cylinder, and an outer peripheral surface of the inner cylinder.

15. The fuel reformer of claim 13, wherein the gas discharge passage is defined by a bottom of the intermediate cylinder, an inner peripheral surface of the inner cylinder, and a conduit connecting the inner peripheral surface of the inner cylinder and the selective oxidation section.

16. The fuel reformer of claim 1, further comprising a vacuum heat insulating layer provided on an outer periphery of the vessel.

17. A fuel reformer, comprising:
a high-temperature unit having a combustion chamber in which fuel is burned, and a reforming section disposed on the outer peripheral side of the combustion chamber, surrounding the combustion chamber and filled with a reforming catalyst;
a medium-low-temperature unit having a shift converter section for shift-converting reformate having passed through the reforming section of the high-temperature unit, and a selective oxidation section for performing selective oxidation of the reformate shift-converted in the shift converter section;
a reforming additive water passage which is disposed in such a manner that reforming additive water can undergo heat exchange in the medium-low-temperature unit and which can supply the reforming additive water to the high-temperature unit;
a second reforming additive water passage for supplying reforming additive water directly to the high-temperature unit, not through the medium-low-temperature unit;
a reforming material supply passage for supplying reforming material to the high-temperature unit; and
a mixing chamber communicating the reforming additive water passage, the second reforming additive water passage and the reforming material supply passage.

* * * * *